United States Patent Office 3,544,430
Patented Dec. 1, 1970

3,544,430
SULFOLANE TREATMENT
Clifford H. Mihm, Borger, Tex., assignor to Phillips Petroleum Company, a corporation of Delaware
No Drawing. Filed Sept. 29, 1967, Ser. No. 671,619
Int. Cl. C07d 63/02; B01d 3/34
U.S. Cl. 203—29           4 Claims

ABSTRACT OF THE DISCLOSURE $SO_2$ precursors in sulfolanes causing undesirable build up of $SO_2$ therein due to the thermal instability are removed by the treating of sulfolane at a temperature in the range of about 200 to 350° F. with a reagent selected from the group consisting of aqueous sodium hydroxide, alkali metal sulfides, alkali metal bisulfides, organic disulfides, tertiary butyl catechol, diethanolamine, triethanolamine and diisopropanolamine.

---

This invention relates to the purification of sulfolanes. More specifically, this invention relates to the removal of $SO_2$ precursors from off-spec sulfolanes.

BACKGROUND OF THE INVENTION

The sulfolanes are well known solvents useful in extractive distillations, solvent extractions, and the like, especially in petroleum processing for the separation of hydrocarbon mixtures. They are prepared by reacting a conjugated diolefin with sulfur dioxide and hydrogenating the resulting sulfolene to the corresponding sulfolaen. Thus sulfolane and the substituted sulfolanes, such as the mono- and dimethyl sulfolanes, are prepared by reacting butadiene, methylbutadiene and dimethylbutadienes with sulfur dioxide to form sulfolene, methylsulfolene and dimethylsulfolene, respectively, and then catalytically hydrogenating the particular sulfolene, as by using a Raney nickel catalyst, to the corresponding sulfolane. Production of sulfolane according to the above technique is set forth in U.S. 3,152,144.

Purity of the sulfolanes is critical if the products are to be commercially acceptable. The compounds must have low impurity content. While various techniques have been proposed for the production of sulfolanes which meet the required purity standards, difficulty has been experienced in the storage of these initially pure products because of their tendency to develop an undesirable build up of the sulfur therein as represented by the $SO_2$ content of the product due to the presence of unknown $SO_2$ precursors therein.

DESCRIPTION OF THE INVENTION

Accordingly, it is an object of this invention to provide a process for the purification of off-specification sulfolanes. Another object of this invention is to provide a process for the treatment of the sulfolane product which precludes the going off-spec of the sulfolane during storage. A further object of the invention is to treat off-spec sulfolanes to remove $SO_2$ precursors therefrom.

Other objects, aspects and the several advantages of the invention will be readily apparent to those skilled in the art from the following description and the appended claims.

In accordance with the present invention, I have discovered that the sulfolanes can be precluded from going off-spec or purified by treating the off-spec material so as to remove the $SO_2$ precursors with a reagent selected from the group consisting of aqueous sodium hydroxide, alkali metal sulfides, alkali metal bisulfides, organic disulfides, tertiary butyl catechol, and alkanolamines at a temperature in the range of about 200 to 350° F.

The term "sulfolane" as employed herein and in the appended claims refers to a saturated sulfolane compound which may be either unsubstituted or substituted. The sulfolane compound contains or consists of a saturated five-membered ring of four carbon atoms and a sulfur atom, the latter having two oxygen atoms directly attached thereto The structural formula of the simple unsubstituted sulfolane, therefore, is:

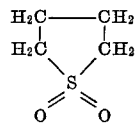

The generic term "a sulfolane" or "a sulfolane compound" covers not only the above compound but also the substituted derivatives thereof, particularly those in which various radicals are substituted for one or more of the hydrogen atoms of the above structure.

The term "off-spec" sulfolanes as used herein means sulfolane or substituted sulfolanes which have a value above 20 milligrams of $SO_2$ generated per 250 milliliters of a sulfolane per hour at 180° C., when subjected to the thermal stability test described hereinbelow. Such compounds can be off-spec as initially produced or after storage.

Sulfolane,

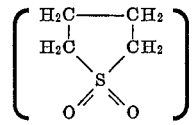

to be commercially acceptable, must meet certain specifications. One such specification for anhydrous sulfolane is:

| Property | Limit | Test |
|---|---|---|
| Density, 30° C., g./ml | 1.260–1.270 | ASTM D941. |
| Sulfur, wt. percent | 26.0–27.0 | ASTM D129. |
| Thermal stability, mg. $SO_2$. | 20 max | Phillips method WK.[1] |
| Purity, wt. percent | 99.0 mln | Phillips method VU.[2] |
| Water, wt. percent | 0.25 max | ASTM D1744. |
| Ash, wt. percent | 0.10 max | ASTM D482. |
| Distillation, percent cond.,° C. | 5% max. at 282° C.; 95% min. at 288° C. | ASTM D1078. |

[1] A 250 ml. sample of sulfolane is heated rapidly to 356° F. (180° C.) and then purged with nitrogen at the rate of about 4 liters per hour fo a period of one hour. This gaseous effluent is passed through an absorber filled with 6% hydrogen peroxide. The peroxide solution ($SO_3$= is converted $SO_4$=) is then titrated with NaOH to an end point using methyl purple as the indicator. The results are reported as *milligrams of $SO_2$ per 250 ml. per hour at 180° C.*

[2] Freezing point determination. (About 82° F. for this sulfolane.)

Of the various specifications required to be met by the various sulfolanes, thermal stability presents a major problem due to the presence of $SO_2$ precursors.

While not intending to be limited to any particular theory, the $SO_2$ precursors removed by the process of this invention are considered to be trace residual compounds which either form during the formation of the sulfolanes and are carried over to the final product or else develop during the handling and storage of sulfolanes subsequent to their formation by the hydrogenation of $SO_2$-free sulfolene.

It is pointed out that sulfolane products from manufacturing have been previouslsy purified by fractionation, wherein the kettle of the fractionator is held at 350° F. for a period of from four to eight hours to thermally crack decomposable materials. The decomposition products are removed. The thus treated sulfolanes are flashed overhead, condensed, and air purged to remove any remaining $SO_2$.

The treatment of the sulfolanes can be carried out in any type of apparatus which is generally employed in the contacting and distillation of a liquid material. The process comprises the steps of (1) contacting the off-specification sulfolanes with the treating agent at a temperature in the range of 200 to 350° F. for a period of 1 to 5 hours, preferably about 4 hours; (2) flash distilling (under vacuum) the resulting treated sulfolane; and (3) thereafter air purging the treated product.

The contacting of the sulfolane with the treating agent is generally carried out at atmospheric pressure although pressures within the range of 20 mm. of Hg. to several atmospheres pressure can be employed. (The pressure depends upon temperatures used and the boiling point of the specific sulfolane treated in the liquid phase.)

Specific treating agents which can be utilized in the treatment of the off-specification sulfolanes in accordance with the present invention include sodium hydroxide, sodium bisulfide, sodium sulfide, diethanolamine, tertiary butyl catechol, triethanolamine, diisopropanolamine and ditertiary butyl disulfide.

Of these various reagents, sodium bisulfide (mono) hydrate is the preferred reagent.

When sodium hydroxide is utilized as the treating agent, the amount thereof should be no more than 0.04 weight percent based on the amount of sulfolane being treated. The remaining agents can be present in an amount 0.01 to 5.0 weight percent or more.

The $SO_2$ determined in the Phillips Test Method WK for thermal stability is not $SO_2$ as such but rather develops from unknown $SO_2$ precursors which are decomposed to $SO_2$ and other materials under the conditions of the test.

The $SO_2$ so determined is likewise not the decomposition of the sulfolanes product since the test conditions are below their decomposition temperatures.

Flashing of the treated sulfolanes is generally carried out by reduction of the pressure in the contacting zone to a pressure in the range of 5 mm. Hg. to about atmospheric pressure. (Depends on boiling point of the specific sulfolane to be flashed overhead, and the temperature of flashing.)

The air purging is achieved by introduction of air at a temperature in the range of about 50° F. to 400° F., preferably at 200° F. for a period of time of one half hour to about 8 hours.

Sulfolanes obtained as a product of the invention have satisfactory thermal stability values (below 20).

The following example will serve to further illustrate the invention.

EXAMPLE

A series of samples of off-spec sulfolane having $SO_2$ content above 20 as determined by the stability test were treated with a variety of agents to determine the effectiveness of the agent in reducing this $SO_2$ value.

Thermal stability of the resulting treated sulfolene was determined by taking a 250 ml. sample and heating same rapidly to 356° F. The resulting hot sulfolane was thereafter purged with nitrogen (about 4 liters of nitrogen per hour) for a period of one hour held at 356° F. The effluent was passed through an absorber filled with 6% hydrogen peroxide. The peroxide solution was then titrated with sodium hydroxide to an end point using methyl purple as the indicator. The results were reported as milligrams of $SO_2$ per 250 ml./per hour at 356° F. (180° C).

The following results were obtained:

| Sample No. | 1 | 2 | 3 | 4 | 5 | 6 | 7 | 8 |
|---|---|---|---|---|---|---|---|---|
| Treating agent | NaOH | NaHS·H$_2$O | Na$_2$S·9H$_2$O | Tertiary butyl catechol. | Diethanol amine. | Triethanol amine. | Diisopropanol amine. | Ditertbutyl disulfide. |
| Stability test (untreated) mg. SO$_2$/250 ml. | 23 | 38 | 23 | 51 | 38 | 38 | 38 | 51 |
| Stability test (after treatment). | 9 | 2 | 6 | 8 | 6 | 7 | 8 | 12 |
| Treating reagent (wt. percent sulfolane). | 0.04 (Aqueous) | 0.10 (Flake) | 0.02 (Crystal) | 0.2 (Liquid)[1] | 0.13 (Liquid) | 0.13 (Liquid) | 0.09 (Waxy solid) | 0.5 (Liquid) |

[1] 50-50 volume mixture of 50 wt. percent aqueous NaOH and tertiary butyl catechol.

Treatment procedure: The reagents were added to sulfolane and merely mixed (not any extended mixing time). The treated sulfolane was flashed directly off the reagent at 20 mm. Hg absolute pressure, condensed, and purged one hour at 200° F. with air.

The above data clearly show that treatment of the off-specification (off-spec) sulfolane with the agents of the instant invention results in the reduction of the $SO_2$ content as determined by the stability test substantially below the normally acceptable value of 20, and accordingly provides a product which more than meets the normal standards required in the industry.

Reasonable variations and modifications are possible within the scope of this disclosure without departing from the spirit and scope thereof.

I claim:

1. A process for the treatment of a mixture consisting essentially of a sulfolane containing $SO_2$ precursors so as to essentially remove the $SO_2$ precursors therefrom which comprises contacting said mixture of sulfolanes and $SO_2$ precursors with a treating agent which consists essentially of at least one agent selected from those of the group consisting of aqueous sodium hydroxide, alkali metal sulfides, alkali metal bisulfides, di-tertiary butyl disulfide, tertiary butyl catechol, diethanolamine, triethanolamine and diisopropanolamine for a period of from 1 to 5 hours at a temperature of 200° to 350° F. and thereafter recovering the resulting essentially $SO_2$ precursor-free sulfolane as a product of the process.

2. A process according to claim 1 wherein said aqueous alkali metal bisulfide agent is sodium bisulfide (mono) hydrate.

3. A process according to claim 1 wherein the sulfolane is flashed from said agent following treatment thereof with said agent.

4. A process according to claim 3 wherein the flashed sulfolane is air purged prior to recovery by contacting said sulfolane with air having a temperature of about 50 to 400° F.

References Cited

UNITED STATES PATENTS 3,347,621  10/1967  Papadopaulos et al. _____ 23—2

HENRY R. JILES, Primary Examiner

C. M. SHURKO, Assistant Examiner

U.S. Cl. X.R.

203—4, 37, 38, 59, 88; 260—332.1